United States Patent
Bradley et al.

(10) Patent No.: US 9,619,513 B2
(45) Date of Patent: Apr. 11, 2017

(54) CHANGED ANSWER NOTIFICATION IN A QUESTION AND ANSWER SYSTEM

(71) Applicant: International Business Machines Corporation, Armonk, NY (US)

(72) Inventors: Lisa M. W. Bradley, Cary, NC (US); Christina R. Carlson, Chanhassen, MN (US); Andrew R. Freed, Cary, NC (US); Roderick C. Henderson, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 14/446,113

(22) Filed: Jul. 29, 2014

(65) Prior Publication Data

US 2016/0034457 A1    Feb. 4, 2016

(51) Int. Cl.
G06F 7/00       (2006.01)
G06F 17/30      (2006.01)
G06F 15/16      (2006.01)

(52) U.S. Cl.
CPC ...... *G06F 17/3043* (2013.01); *G06F 17/3053* (2013.01); *G06F 17/30864* (2013.01)

(58) Field of Classification Search
CPC ............. G06F 17/3043; G06F 17/3053; G06F 17/30864
USPC ....................................................... 707/749
See application file for complete search history.

(56) References Cited

U.S. PATENT DOCUMENTS

| | | |
|---|---|---|
| 5,751,378 A | 5/1998 | Chen et al. |
| 6,542,889 B1 | 4/2003 | Aggarwal et al. |
| 7,225,187 B2 | 5/2007 | Dumais et al. |
| 7,295,965 B2 | 11/2007 | Haigh et al. |
| 7,945,525 B2 | 5/2011 | Ananthanarayanan et al. |
| 8,254,685 B2 | 8/2012 | Greene et al. |

(Continued)

FOREIGN PATENT DOCUMENTS

| | | |
|---|---|---|
| WO | WO02/29618 A1 | 4/2002 |
| WO | WO2011/065617 A1 | 6/2011 |
| WO | WO2012/122196 A2 | 9/2012 |
| WO | WO2013/192584 A1 | 12/2013 |

OTHER PUBLICATIONS

"List of IBM Patents or Patent Applications Treated as Related", Oct. 28, 2015, 2 pages.

(Continued)

*Primary Examiner* — Usmaan Saeed
*Assistant Examiner* — Brian E. Weinrich
(74) *Attorney, Agent, or Firm* — Stephen J. Walder, Jr.; Diana R. Gerhardt

(57) ABSTRACT

Mechanisms are provided, in a question and answer (QA) system, for monitoring changes in answers to previously submitted questions. A question is received for which an answer is to be generated. One answer for the question is generated and the question, answer, and a notification party are registered in a question registration data structure. Another answer to the question is generated, at a later time than when the previous answer was generated. A degree of a change in the two answers to the question is determined. An answer change notification is transmitted to the notification party based on the degree of the change in the two answers to the question. The notification party may be the source of the question or a registered party to which notifications are to be sent.

14 Claims, 7 Drawing Sheets

(56) References Cited

U.S. PATENT DOCUMENTS

| | | | |
|---|---|---|---|
| 8,275,803 B2 | 9/2012 | Brown et al. | |
| 8,402,054 B2 | 3/2013 | Frazier et al. | |
| 8,538,744 B2 | 9/2013 | Roberts et al. | |
| 8,555,281 B1 | 10/2013 | van Dijk et al. | |
| 8,600,986 B2 | 12/2013 | Fan et al. | |
| 8,626,784 B2 | 1/2014 | Beaudreau et al. | |
| 8,636,515 B2 | 1/2014 | Burgin et al. | |
| 8,706,653 B2 | 4/2014 | Kasneci et al. | |
| 8,935,277 B2* | 1/2015 | Kuchmann-Beauger | G06F 17/30958 707/769 |
| 2006/0246410 A1* | 11/2006 | Iwayama | G09B 7/00 434/323 |
| 2008/0104065 A1* | 5/2008 | Agarwal | G06Q 10/10 707/999.006 |
| 2009/0287678 A1 | 11/2009 | Brown et al. | |
| 2010/0281091 A1 | 11/2010 | Wakao | |
| 2011/0066587 A1 | 3/2011 | Ferrucci et al. | |
| 2011/0125734 A1 | 5/2011 | Duboue et al. | |
| 2012/0065480 A1 | 3/2012 | Badilini et al. | |
| 2012/0078837 A1 | 3/2012 | Bagchi et al. | |
| 2012/0078873 A1* | 3/2012 | Ferrucci | G06N 5/02 707/708 |
| 2012/0078890 A1* | 3/2012 | Fan | G09B 7/00 707/723 |
| 2012/0191716 A1 | 7/2012 | Omoigui | |
| 2013/0007037 A1* | 1/2013 | Azzam | G06F 17/30654 707/769 |
| 2013/0007055 A1 | 1/2013 | Brown et al. | |
| 2013/0017524 A1 | 1/2013 | Barborak et al. | |
| 2013/0018652 A1 | 1/2013 | Ferrucci et al. | |
| 2013/0029307 A1 | 1/2013 | Ni et al. | |
| 2013/0041921 A1 | 2/2013 | Cooper et al. | |
| 2013/0052630 A1* | 2/2013 | Mine | G09B 7/02 434/353 |
| 2013/0066886 A1 | 3/2013 | Bagchi et al. | |
| 2013/0097110 A1 | 4/2013 | Kwon | |
| 2013/0103382 A1 | 4/2013 | Kim et al. | |
| 2013/0218914 A1 | 8/2013 | Stavrianou et al. | |
| 2013/0226453 A1 | 8/2013 | Trussel et al. | |
| 2013/0304730 A1* | 11/2013 | Zhou | G06F 17/30864 707/723 |
| 2014/0058766 A1 | 2/2014 | Yu et al. | |
| 2014/0058986 A1 | 2/2014 | Boss et al. | |
| 2014/0172882 A1* | 6/2014 | Clark | G06F 17/30038 707/749 |
| 2014/0172883 A1 | 6/2014 | Clark et al. | |
| 2015/0290531 A1* | 10/2015 | Herz | G09B 7/00 434/237 |

OTHER PUBLICATIONS

Allen, Corville et al., "Determining Temporal Categories for a Domain of Content for Natural Language Processing", filed Jun. 5, 2014, U.S. Appl. No. 14/297,335.
Allen, Corville et al., "Time-Based Optimization of Answer Generation in a Question and Answer System", filed Jun. 5, 2014, U.S. Appl. No. 14/297,267.
"List of IBM Patents or Patent Applications Treated as Related", Aug. 12, 2015, 2 pages.
"Method and System for Managing Cases When an Answer Changes in a Question Answering System", IP.com, IP.com No. 000237471, Jun. 18, 2014, 3 pages.
High, Rob , "The Era of Cognitive Systems: An Inside Look at IBM Watson and How it Works", IBM Corporation, Redbooks, Dec. 12, 2012, 16 pages.
Magnini, Bernardo et al., "Is it the Right Answer? Exploiting Web Redundancy for Answer Validation", Proceedings of the 40th Annual Meeting of the Association for Computational Linguistics (ACL), Philadelphia, Jul. 2002, pp. 425-432.
Yuan, Michael J., "Watson and healthcare, How natural language processing and semantic search could revolutionize clinical decision support", IBM developerWorks, IBM Corporation, Apr. 12, 2011, 14 pages.
"Apache ODF Toolkit (incubating)", The Apache Software Foundation, http://incubator.apache.org/odftoolkit/odfdom/index.html, accessed online Mar. 12, 2015, 2 pages.
"Ignoring SSL certificate in Apache HttpClient 4.3", Stack Overflow, http://stackoverflow.com/questions/19517538/ignoring-ssl-certificate-in-apache-httpclient-4-3, accessed online Mar. 12, 2015, 5 pages.
"List of IBM Patents or Patent Applications Treated as Related", Jul. 15, 2015, 2 pages.
"Microsoft Office—Tools to Get Work Done", Microsoft Corporation, http://office.microsoft.com/en-us/, accessed online Mar. 12, 2015, 5 pages.
"Natural language processing", Wikipedia, http://en.wikipedia.org/wiki/Natural_language_processing, last modified Mar. 10, 2015, accessed online Mar. 12, 2015, 12 pages.
"Oracle Outside In Technology", Oracle Corporation, http://www.oracle.com/us/technologies/embedded/025613.htm, accessed online Mar. 12, 2015, 2 pages.
"SPSS Statistics", IBM Corporation, http://www-01.ibm.com/software/analytics/spss/products/statistics/, accessed online Mar. 12, 2015, 2 pages.
"SPSS Text Analytics for Surveys", IBM Corporation, http://www-01.ibm.com/software/analytics/text-analytics-for-surveys/, accessed online Mar. 12, 2015, 2 pages.
Li, Fangtao et al., "Answer Validation by Information Distance Calculation", Coling 2008: Proceedings of the 2nd Workshop on Information Retrieval for Question Answering (IR4QA), Aug. 2008, pp. 42-29.
McCord, M.C. et al., "Deep parsing in Watson", IBM J. Res. & Dev. vol. 56 No. 3/4 Paper 3, May/Jul. 2012, pp. 3:1-3:15.
Oliver, Andrew et al., "Apache POI—the Java API for Microsoft Documents", The Apache Software Foundation, http://poi.apache.org/, accessed online Mar. 12, 2015, 2 pages.

* cited by examiner

CHANGED ANSWER NOTIFICATION IN A QUESTION AND ANSWER SYSTEM

BACKGROUND

The present application relates generally to an improved data processing apparatus and method and more specifically to mechanisms for providing notifications of a change in an answer to a previously registered question using a question and answer system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a question and answer (QA) system comprising a processor and a memory, for monitoring changes in answers to previously submitted questions. The method comprises receiving, by the QA system, a question for which an answer is to be generated by the QA system based on analysis of a corpus of information. The method further comprises generating, by the QA system, a first answer to the question and registering, by the QA system, the question, the first answer, and an identifier of a notification party, in a question registration data structure. Moreover, the method comprises generating, by the QA system at a later time than when the first answer is generated, a second answer to the question and determining, by the QA system, a degree of change between the first answer and the second answer. In addition, the method comprises transmitting, by the QA system, an answer change notification to the notification party based on the degree of the change between the first answer and second answer to the question.

In other illustrative embodiments, a computer program product comprising a computer useable or readable medium having a computer readable program is provided. The computer readable program, when executed on a data processing system implementing a QA system, causes the QA system to perform various ones of, and combinations of, the operations outlined above with regard to the method illustrative embodiment.

In yet another illustrative embodiment, a QA system/apparatus is provided. The QA system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
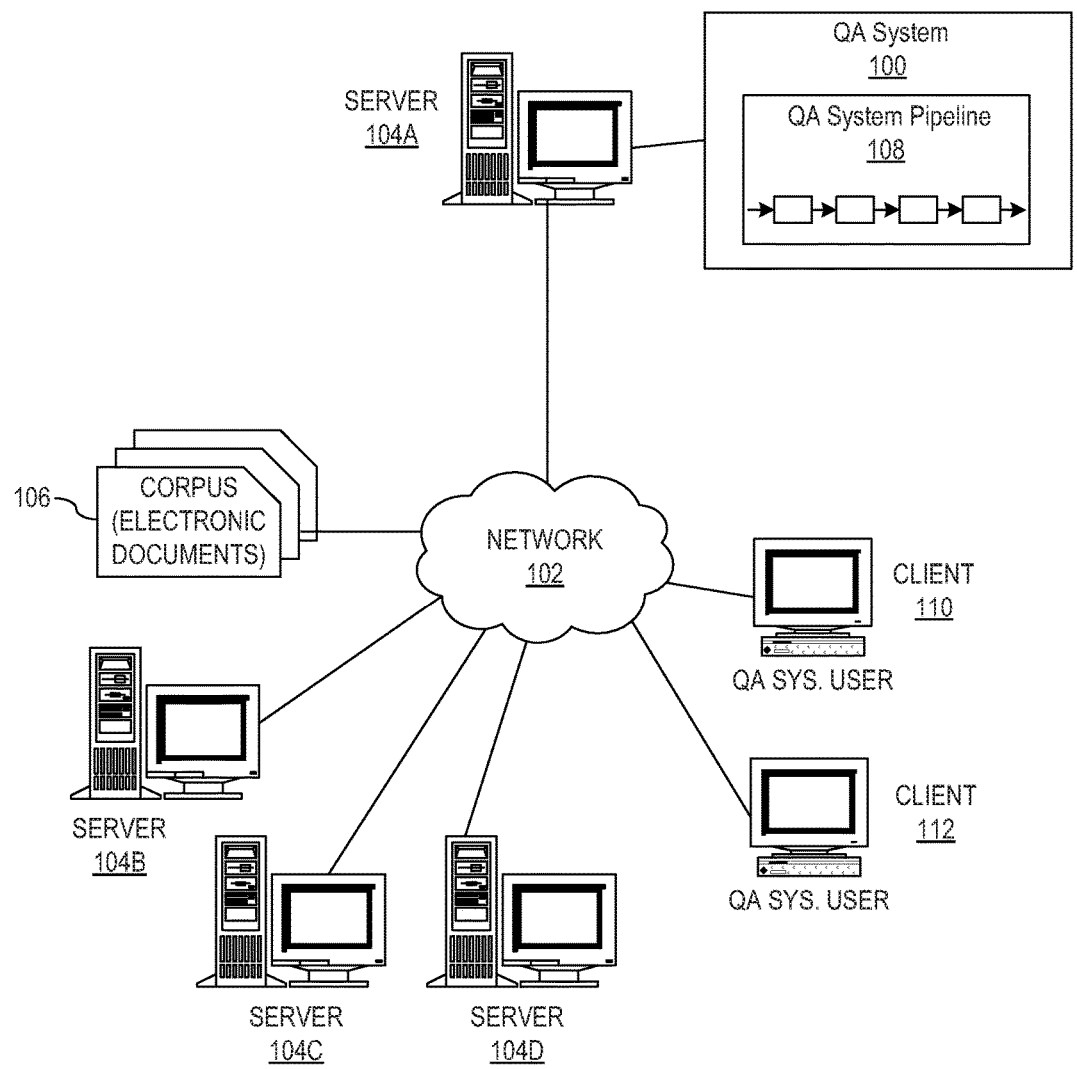
FIG. 1 depicts a schematic diagram of one illustrative embodiment of a question/answer creation (QA) system in a computer network.

The illustrative embodiments provide mechanisms for notifying users when the answers to a previously submitted question have changed. That is, it has been noted that in many instances, as a corpus of information changes, or as the operation of a natural language processing system changes, such as a Question and Answer (QA) system changing its operation due to machine learning processes where the QA system learns how to better answer input questions, previously supplied answers and/or their confidence measures may change. Thus, for example, as more information is provided via the corpus, more evidence is provided that may support or refute a previously offered answer to an input question and may change whether that answer is in fact a valid answer for the previously submitted question, is as highly ranked as it was in a previous submission of the input question, or the like. Thus, the answer to the input question may in fact change as more information is provided. Moreover, through machine learning, such as via user feedback input provided to the QA system, the QA system may modify its operation and thus, modify the answers generated to input questions and/or the ranking it gives to answers, thereby again resulting in possible different answers or different confidence measures and rankings of the answers returned by the QA system.

The illustrative embodiments monitor for such conditions causing a change in answer to an input question and present notifications to users that previously submitted questions for which the answers have changed or the corresponding confidence measure and/or ranking of the answers have changed. With the mechanisms of the illustrative embodiments, the QA system may register input questions automatically, or a user may request the registration of questions via the QA system, for notification of changed answers. The QA system monitors registered questions to determine if the answers to the registered questions, at a later time from the registration of the questions, have changed. The QA system further determines whether the change to the answers to the questions are significant to warrant a notification of the change to the source of the questions or a registered party to which the notifications are to be sent. The significance is measured by the QA system based on a calculated function of the difference between the previous answer to the input question and a current answer to the input question. In some embodiments, this may be extended not only to the final answer returned by the QA system, but also the ranked listing of candidate answers generated by the QA system such that even if the final answer does not change significantly, significant changes in lower ranked candidate answers may be significant enough to warrant a notification. Whether a change is sufficiently "significant" or not is determined according to pre-determined thresholds, which may be global or notification party specific (for ease of explanation, it will be assumed hereafter that the notification party is the user that submitted the input question originally, but it should be appreciated that a different notification party may be specified without departing from the spirit and scope of the illustrative embodiments). In the case of notification party specific criteria for determining whether a change is sufficiently significant, different parties may have different criteria and thus, notifications may not be sent to all parties.

If the change to the answer, or list of candidate answers, is determined to be significant, then the system sends a notification to the notification party (user) if the answers have changed. The notification is actually sent to the notification party's communication device, e.g., client computer, mobile phone, portable digital device such as a tablet computer, or the like. The notification itself may indicate that there has been a change to the answer generated for the previously submitted input question, may identify and/or replicate the input question, may identify and/or replicate the original answer/list of candidate answers previously presented for the input question, and may identify the current (or new) answer/list of candidate answers for the input question. It should be noted that multiple notification parties (users) may have submitted similar questions and thus, the notification may be sent to multiple notification parties (users). The determination of whether questions are similar may be performed based on a comparison of features extracted from the questions, e.g., similar focus, similar lexical answer types, similar keywords, etc.

In order to avoid sending notifications of changed answers to every user that submitted a similar question whenever there is any change to the answer for that similar question, the mechanisms of the illustrative embodiments may further take into consideration a user profile associated with the user(s) that submitted the question or similar question. The user profile may establish a set of notification criteria that indicate additional considerations to be evaluated by the QA system prior to sending a notification of a changed answer to that particular user with which the user profile is associated. For example, pre-established thresholds for the QA system may indicate that whenever a question changes by more than 40%, an answer change notification is to be transmitted to the users that registered that question for changed answer notification. However, a particular user's profile may override that pre-established threshold and indicate that the user only wishes to receive answer change notifications for answers that have changed more than 50% whereas another user that submitted the same or similar question may specify that the user only wishes to receive changed answer notifications if the change in the answer is 25%. In such a case, the changed answer notification would not be sent to the first user but would be sent to the second user.

In other embodiments, the notification criteria specified as a user profile may not itself be specified specifically for use with the notification mechanisms of the illustrative embodiments but may be more generic in nature, such as demographic information, geographical location information, e.g., home address, current location as determined from a global positioning system or other triangulation system, or the like, communication contact information, personal interests, hobbies, employment information, educational status, historical information about the user, and the like. The mechanisms of the illustrative embodiments may evaluate such information to determine whether a notification should be sent to that particular user. For example, if an registered question is "Will there be a storm tomorrow?", the mechanisms of the illustrative embodiments will interpret this question to reference the local geographical region of the user's home address or current location evaluate whether to send a notification to the user based on whether the change in answer to the question affects the user's home address location or current location. For example, if the original answer to the above question was "there is a 25% chance of a storm tomorrow" and later this question is re-evaluated due to a change in the corpus of information with the new answer being determined to be "there is a 75% chance of a storm in the Dallas area", this change in answer may be pertinent to users in the Dallas area but would not be of much concern to users in the Houston area or Oklahoma City area. Thus, while there may have been a significant change in the answer, the significance is lower for users that do not have locations within a specified range of the location associated with the changed answer. Thus, the notification may be sent only to the users who submitted the question, or similar question, and whose profiles indicate a registered geographical location, or current location, within a predetermined range of the geographical location to which the changed answer corresponds.

As a further example, consider a user that submits a question of "When should men get a colonoscopy?" Based on the medical knowledge at the time as documented in a medical corpus of information, the QA system may return an answer of "Men should get a colonoscopy at age 45." At a later time, as more medical knowledge is obtained and documented through addition of this information to the medical corpus, this answer may change. Thus, a year later, the medical knowledge may result in an answer to the same question being "Men should get a colonoscopy at age 40." The difference in the two answers is relatively low, e.g., a 10% difference in the content of the answer, but its relevance may be high to particular users based on their age. That is, a user that submits this question who is currently 38 years old should probably be notified that this answer has been changed since the user is likely to need this knowledge within a short period of time, i.e. within the next 2 years since the user is approaching the age at which a colonoscopy should be performed. However, a user that is 62 years old may not need to be notified of this change in the answer to the input question since their age is not close to either the old or the new answer.

Hence, with the implementation of the mechanisms of the illustrative embodiments, changes in answers to previously submitted questions may be automatically monitored and used as a basis for sending notifications to submitters of such questions, or other identified notification parties, so as to keep these persons informed of the most recent answers to their previously submitted questions. In order to manage these notifications, a registration of questions may be generated that associates notification parties with the questions so that the correct notification parties may be identified. Moreover, notification criteria may be evaluated both globally and at a specific notification party level to identify which notification parties, associated with questions whose answers have changed by a significant amount, to which the notifications should be sent.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

It should further be noted that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
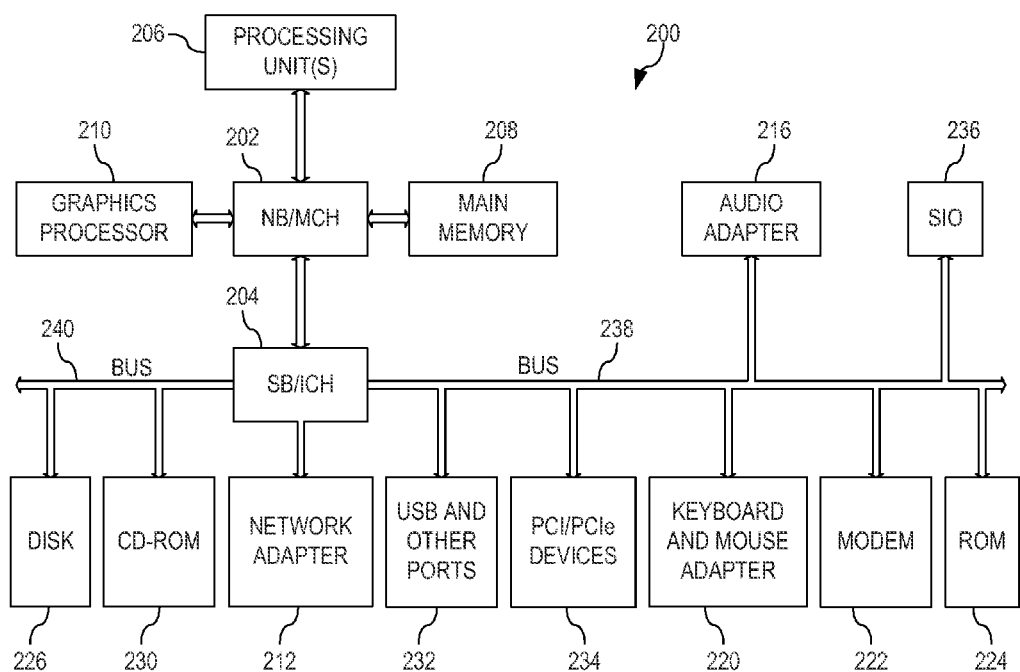
FIG. 2 is a block diagram of an example data processing system in which aspects of the illustrative embodiments may be implemented.
Figure 3:
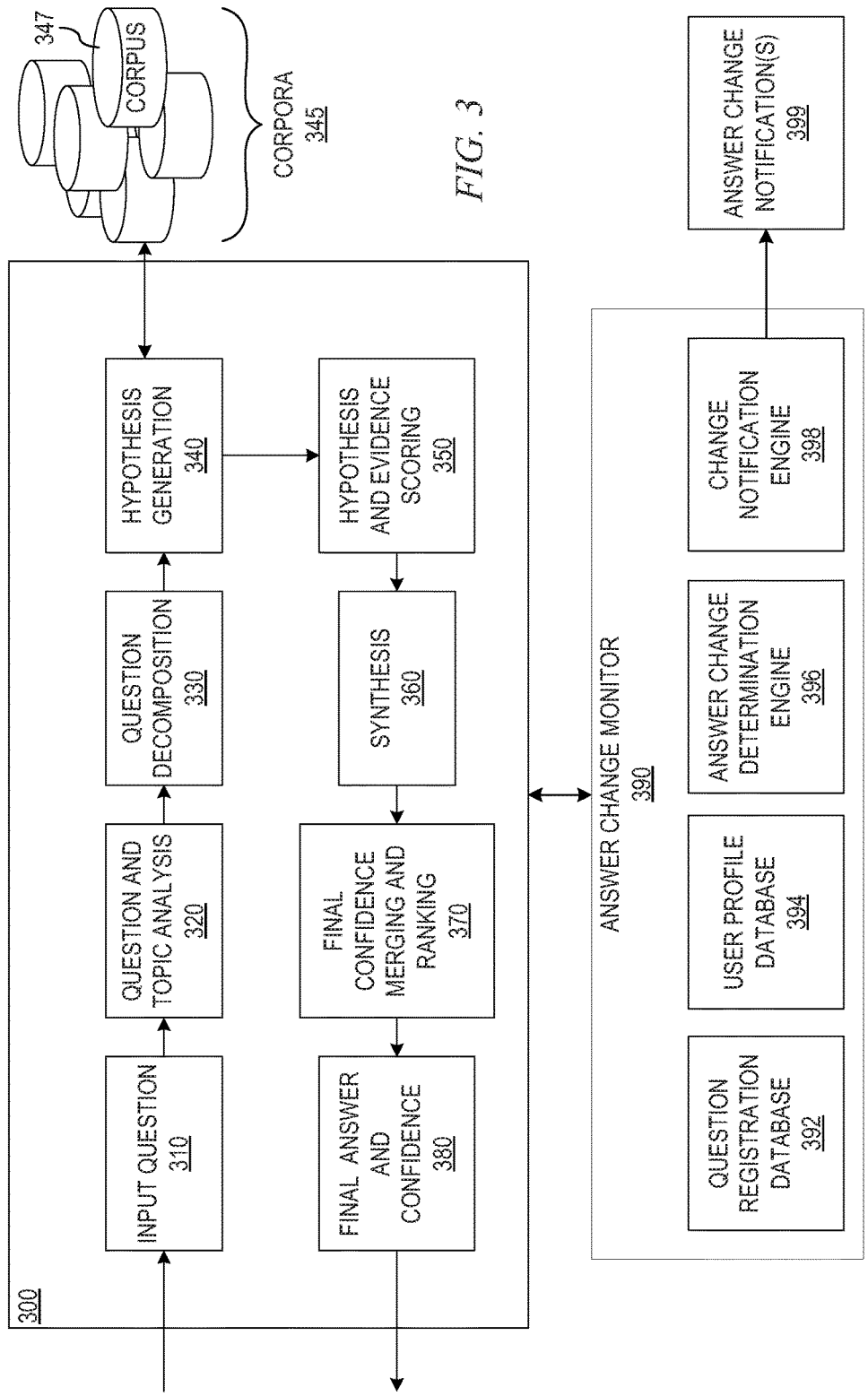
FIG. 3 illustrates a QA system pipeline for processing an input question in accordance with one illustrative embodiment.

The illustrative embodiments may be utilized in many different types of data processing environments. In particular, since the mechanisms of the illustrative embodiments are directed to the notification of changes in answers to previously submitted input questions via a QA system, it follows that the illustrative embodiments are especially well suited for implementation with a data processing system, comprising one or more computing devices, that implements a QA system which may be augmented with the mechanisms described herein. Therefore, in order to provide a context for the description of the specific elements and functionality of the illustrative embodiments, FIGS. 1-3 are provided hereafter and are directed to describing an example QA system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to the registration of questions for monitoring for changed answer conditions, the monitoring of the answers for such registered questions, and the generation and transmission of notifications of changes in answers to previously submitted questions.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104A-104D (comprising one or more processors and one or more memories, and potentially any other computing device elements generally known in the art including buses, storage devices, communication interfaces, and the like) connected to the computer network 102. The network 102 may include multiple computing devices 104A-104D, 110, and 112 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, subsystems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104A-104D on the network 102 may include access points for content creators and QA system users. Some of the computing devices 104A-104D may include devices for a database storing the corpus of electronic documents 106 represented as data (which is shown as a separate entity in FIG. 1 for illustrative purposes only). Portions of the corpus 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus 106. In one embodiment, the questions may be formed using natural language. The QA system 100 may interpret the question and provide a response to the QA system user, e.g., via the QA system user client computing device 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus 106, and generating answers for the input question based on the processing of the corpus 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter (user) of the original input question.

As shown in FIG. 3, in accordance the illustrative embodiments, an answer change monitor 390 is provided in association with the QA system pipeline 300 for registering the input question 310 as well as the answer information generated by the QA system pipeline as a result of processing the input question 310 via the QA system pipeline 300. In registering the input question 310, a user, when submitting input question 310 via a graphical user interface or other input interface, may be presented with an option to be notified of changes to the answer generated by the QA system. Alternatively, this may be done via the user interface generated when the QA system pipeline 300 outputs the final answer and/or listing of candidate answers, such as in stage 380, for example. The graphical user interface may further provide options for the user to set preferences for such notifications, such as a predetermine amount of difference in the old and new answers, whether the new answer is associated with a geographical location of the user, whether the new answer is relevant to the user's user profile information, a time period over which such changes in answers should be monitored for this question and user, or the like.

The registration of the question by the answer change monitor 390 in the question registration database 392 may involve storing an entry in the question registration database 392 that correlates to the question, the final answer and/or the ranked listing of candidate answers, confidence scores associated with the answer(s), an identifier of the user that submitted the question, and a time period over which to monitor the answers for the question for this particular user (a default time period may be established when the user does not specify, e.g., 1 week, 6 months, etc.). The identification of the user that submitted the question may be correlated with another user profile database 394 for retrieval of user profile information to assist in relevancy determinations performed when determining whether to send notifications of changed answers as will be described in greater detail hereafter.

In addition, when registering a question with the question registration database 392, a determination may be made as to whether a previously submitted question that is similar in nature may already be registered in the question registration database 392. This may involve comparing the extracted features of the input question 310 to the same types of features of the previously submitted questions that are already registered in the question registration database 392. Moreover, this may further involve comparing features extracted from the final answer and/or candidate answers in the listing of candidate answers to determine if the answer(s) generated for the current input question 310 are similar to answers generated for a similar previously submitted question. Thus, a correlation between the current input question 310 and its generated answer(s) with previously submitted input questions and their answers may be made. In such a case, a new entry may not be generated and instead the existing entry for the previously submitted question that is already registered in the question registration database 392 may be updated to add the information regarding the user that submitted the current input question 310, the selected preferences for notifications, and the like.

Therefore, it should be appreciated that an entry in the question registration database 392 may not be removed from the question registration database 392 until all of the user notification preferences specifying a time span for notifications to be generated have time spans that have elapsed, i.e. if a first user to submit the question requested notifications for a week, and then 3 days later, another user asks a similar question requesting notifications for another week, then the entry in the question registration database 392 would not be removed until a week and 3 days from the submission by the original user's request. While the entry may not be removed, it should be appreciated that after the week duration of the original user's question registration, the original user may no longer receive notifications, i.e. once the week time period has expired, the first user will not receive additional notifications since the time period has expired.

Periodically, or in response to a triggering event, the questions registered in the question registration database 392 may be automatically resubmitted to the QA system pipeline 300 as input questions 310 for processing to determine if the answers to these questions have changed from the time that they were originally, or last, submitted. With a periodic event, a schedule for resubmitting registered questions may be established such that the questions are re-evaluated at a predetermined time, or reoccurring predetermined time interval, to determine if the answers to these questions has changed over an appropriate time period, e.g., weather predictions may change over a relatively short period of time whereas answers to questions such as "Who is the President of the United States?" change over relatively long periods of time. With regard to triggering events, the triggering event may be, for example, an update to the corpus or corpora upon which the QA system pipeline 300 operates, an update to the operation of the QA system pipeline 300 itself, an administrator input requesting that the status of answers to the registered questions be updated, or the like. With regard to the update to the corpus or corpora, when a new document or portion of content is added to the corpus or corpora, the content of the new document may provide additional evidence which, when processed by the QA system pipeline with regard to the question, may result in a different answer being generated or a different confidence measure and/or ranking of the answer relative to other candidate answers.

With regard to the update to the operation of the QA system pipeline 300, machine learning mechanisms may be implemented in the QA system pipeline 300 which utilize the answers generated for questions and a feedback mechanism to modify the way in which the QA system pipeline evaluates evidence passages in the corpus or corpora, analyzes the input question 310, or the like. In one example, user feedback may be received in response to the output of the final answer at stage 380 that indicates whether the final answer is determined to be correct from the user's view point. This feedback information may be used by the QA system pipeline 300 to modify its weightings for different portions of evidence passages, for example, so as to change the way in which the QA system pipeline 300 evaluates evidence in support of or against a particular candidate answer being a correct answer. This may cause a change in the answer that is generated for a previously submitted question or the confidence measure and/or ranked listing of candidate answers based on this new evaluation logic implemented by the QA system pipeline 300, e.g., it may be determined that more weight should be given to a clinical trial results than previously was given to these sources of information and thus, the logic of the QA system pipeline 300 may be modified to implement a new weighting operation to facilitate this new greater weight for clinical trial results information. Of course other sources of change to the QA system pipeline 300 may also cause a need to re-evaluate answers to previously answered questions including a forced update of the QA system pipeline 300 logic by an administrator, addition of new annotators or other logic elements within the QA system pipeline 300, or the like.

In response to the periodically scheduled event, or in response to another triggering event, whatever the triggering event may be, when the registered question is re-evaluated, the question is resubmitted to the QA system pipeline 300 as an input question 310. The re-submitted input question is then re-evaluated by the QA system pipeline 300 to generate a final answer and/or ranked listing of candidate answers with associated confidence scores and/or evidence passages, and the like.

Due to changes in the corpus or corpora 345, 347 and/or the logic implemented by the QA system pipeline 300, e.g., as modified by user feedback, implementation of new annotators, or the like, the final answer and/or ranked listing of candidate answers that is generated by the re-submission of the question may be different from the answer(s) generated by the QA system pipeline 300 during the original submission, or last submission, of the question. Thus, users that submitted the question, or similar question, may want to be informed of the change to the answer(s). However, not every user wants to be informed of every change to such answer(s) even though the question may have been registered by the user for answer change notifications. Therefore, the mechanisms of the illustrative embodiments implement answer change notification filters to determine which users should receive answer change notifications and when.

The answer change notification filter mechanisms of the illustrative embodiments include an answer change determination engine 396 that determines a degree of difference in the currently generated answer and a previously generated answer for the question. The determination that an answer has changed and the degree by which the answer has changed may be performed by comparing the previously generated answer to the currently generated answer and using one or more change algorithms for determining differences in extracted features of the answer, numerical values specified in the answer, and the like. Various algorithms have been developed for evaluating the similarity of lexical content and any known or later developed mechanism for determining such similarities, and differences, may be used without departing from the spirit and scope of the present invention.

In some illustrative embodiments, the differences between the previously generated answer to a question and the currently generated answer to the same question may be determined by the answer change determination engine 396 by generating parse trees of the previous and current answers, comparing the parse trees, and then evaluating the significance of the terms in the parse tree determined to be differences. The terms in the parse tree that are determined to be differences may be determined using various algorithms including, but not limited to, inverse document frequency (IDF) based algorithms which identify the least used terms in the two answers as the most likely location of differences in the answers and then compare like type terms, subject-verb-object (SVO) comparison algorithms, comparison of extracted semantic and syntactic features from both the previous and current answers, and the like.

In one illustrative embodiment, multiple modes of comparison are performed to determine if the previously generated answer and currently generated answer for the question are similar or dissimilar. In a first mode of comparison, a parse tree of the answers are generated, the SVO sets between the answers are analyzed and when the SVOs are comparable, the highest IDF values are analyzed to identify the nodes of the parse tree that have the highest IDF values and determine if there are similar terms in these nodes. Similarity may be determined using various term comparison algorithms, such as considering synonyms, antonyms, character string comparisons, and the like. Example comparisons to determine a percentage difference in terms of a text passage are described in commonly assigned U.S. Pat. No. 7,945,525 entitled "Methods for Obtaining Improved Text Similarity Measures which Replace Similar Characters with a String Pattern Representation by using a Semantic Data Tree" and commonly assigned U.S. Pat. No. 6,542,889 entitled "Methods and Apparatus for Similarity Text Search Based on Conceptual Indexing," which are hereby incorporated by reference. Another example mechanism for determining a difference in text passages is described in Patent Application Publication No. W02002029618A1 to Liu et al., "A Method and Apparatus for Determining Text Passage Similarity."

In a second mode of analysis, the lexical answer type (LAT) of the answers and the IDF score of each term in each answer are compared. For the terms with the highest IDF, the LAT is analyzed to find a term with a corresponding LAT in the other answer and determine if these are similar. Again, similarity may be determined using various term comparison algorithms, such as considering synonyms, antonyms, character string comparisons, and the like.

Having identified a difference in the previously generated answer and the currently generated answer, the answer change determination engine 396 of the answer change monitor 390 then determines the significance of the difference in the previous and current answer and whether this significance is sufficient to warrant the generation of a notification of the change in the answer. This determination may be made, for example, based on global or more generally defined pre-established threshold criteria, whereas more specific or user defined criteria for answer change notifications may be applied by the change notification engine 398 as described hereafter.

The change notification criteria, or thresholds, applied by the answer change determination engine 396 may determine if the change in the answer is even significant enough to consider sending a change notification or not and thus, may be thought of as a default set of criteria for answer change notifications. The criteria may be tailored to particular domains of the questions, types of answers generated, e.g., qualitative or quantitative, particular lexical answer types (LATs), or the like. For example, in the domain of meteorological questions, a difference of an answer of more than 10% may be sufficient to warrant an answer change notification. However, in a domain of geographical information, a difference of 10% may be too small to warrant an answer change notification (since this may be due to minor errors and is likely to not affect decision making), but a difference of 25% may be determined to be a proper threshold at which an answer change notification is warranted. It should be appreciated that these percentages refer to similarities of sentences or portions of sentences in the natural language answers and thus, a 10% difference means that the two answers have sentences that are 90% similar to one another.

It should be appreciated that external sources of information may be utilized in evaluating the differences in a previous and current answer against the criteria for sending answer change notifications. For example, if the domain or concepts mentioned in the answer are of a geographical nature, sources of geographical information may be consulted to determine the degree of change in an answer, e.g., distances between geographical locations. Thus, for example, if the answer changes from being relevant to Miami, Fla. to being relevant to Durham, N.C., and the criteria for sending an answer change notification is a change in geographical location of more than 50 miles, then an external source of information may be consulted to determine what the geographical distance is between Durham, N.C. and Miami, Fla. so that this distance can be compared against the threshold of 50 miles. Other sources of information may be utilized to evaluate other types of answers and criteria.

In some illustrative embodiments, if the percentage difference in the previous and current answer meets or exceeds the criteria, e.g., is equal to or greater than a pre-determined threshold, then the change notification engine 398 is instructed to compose and transmit an answer change notification to each of the notification parties, e.g., users, associated with the question 310 being evaluated. As a result, all of the users that registered a desire to be informed if a change in the answer to the question 310 occurs are sent an answer change notification 399, e.g., an electronic mail message, instant message, pop-up output message on a display, text message on a portable communication device, or any other type of electronic message that may be composed and transmitted. The answer change notification 399 may specify the question, the previous answer, the current answer, the degree of change, and/or any other information pertinent to informing the notification party of the answer change.

Alternatively, if an answer has changed by a sufficient amount to warrant an answer change notification as determined by the answer change determination engine 396, before transmitting the answer change notification, the change notification engine 398 may evaluate the difference in the previous and current answers to the question 310 against specific user profile information and/or user specific answer change notification criteria, as may be stored in the user profile database 394. That is, the users that have registered in the question registration database 392 to receive an answer change notification when the answer to the question 310 changes may be identified and their user profiles retrieved from the user profile database 394. The information stored in the user profile for a user registered to receive the answer change notification may be compared against the difference information for the previous and current answers to determine if the difference is significant for the particular user.

For example, for the portions of the answer that have changed, the concept and lexical answer type (LAT) of those portions may be determined. The portions of the user's profile that are similar to the concept and LAT, e.g., age, location, etc., are identified and compared to the corresponding portions of the answer that have changed. If there are close matches within the same concept/LAT of the changed answer portions and the user profile portions, then the change in the answer is relevant to the particular user and the user should be notified. In some illustrative embodiments, the closeness of matches between the concept/LAT of the changed answer portions and the user profile portions may be augmented by computing a distance metric, e.g., if the answer changed in a given LAT, and the value of that LAT is relatively distant from the user profile value, the change in the answer is not likely to be relevant to the user. For example, if there is a shift in the answer from the answer being pertinent to Massachusetts to being pertinent to New York (such as bad weather front shifting), but the user is located in California, while there is a significant change in the answer as would be identified by the answer change determination engine 396, the change is not relevant to the user in California since California is not near New York, let alone the original answer referencing Massachusetts. Similarly, in another example, if the shift in the answer is from the answer being pertinent to males of age 18 to being pertinent to males of age 40, the answer change may be determined to be significant in general due to the relatively large change in the age, but is not relevant to a user whose age is 65 since they are not near the ages in question, i.e. 18 or 40.

In some cases, the evaluation of user profile information against the changes in the answer by the change notification engine 398 may be predicated on the answer change determination engine 396 determining that change in the answer is not sufficient to warrant an answer change notification. That is, if it is determined that the percentage difference in the previous and current answer is below a predetermined threshold, then the user profile may be consulted to determine if an answer change notification should be sent. For example, if in the example above where there is a change in the answer from being pertinent to males of age 18 to being pertinent to males of age 20, while the change in the answer is relatively small, if the user that registered for answer change notifications is aged 20, this change in the answer may be of particular interest to that user and thus, while generally the answer change notification would not be sent to all users that registered for answer change notifications, this particular user would be sent an answer change notification by the change notification engine 398.

The following are some other examples of answer changes and resulting answer change notifications to further illustrate the operation of the example illustrative embodiments:

Example 1

Question: When should men get a colonoscopy?
Old Answer: Men should get a colonoscopy at age 45.
New Answer: Men should get a colonoscopy at age 40.
Answer Difference: low (10%)
User 1: 38 year old male—this person should be notified because their age is a very close match to the answer text.
User 2: 62 year old male—this person need not be notified because their age is not close to either the old or the new answer with regard to the answer difference.

Example 2

Question: Where is Tropical Storm Bertha expected to land?
Old Answer: Bertha will land in Miami, Fla.
New Answer: Bertha will land in Coral Gables, Fla.
Answer difference: somewhat low. Different city, but geographical distance between old and new answer is only 10 miles.
User 1: Lives in Cary, N.C.—this person should not be notified since the location is not very close to the geographical areas mentioned in the answer difference.
User 2: Lives in Kendall, Fla.—this person should be notified since the location is very close (10 miles) to the geographical area mentioned in the new answer with regard to the answer difference.

Example 3

Question: What is the best way to treat runner's knee?
Old Answer: Reconstructive surgery on the afflicted knee.
New Answer: Physical therapy to build strength in the leg muscles.
Answer difference: high, notify all registered users.

Thus, based on the evaluation performed by the answer change monitor 390, a determination is made as to whether one or more of the users registered to receive answer change notifications should be sent such notifications. If such notifications are to be sent, the communication information for the users that are to receive the answer change notifications is retrieved from the user profiles and corresponding change notifications 399 are sent.

It should be appreciated that while a particular arrangement of elements is shown in FIG. 3, this arrangement is only an example and provided for illustrative purposes. Modifications to the arrangement and division of logic within the QA system pipeline 300 and answer change monitor 390 may be made without departing from the spirit and scope of the illustrative embodiments. For example, the answer change monitor 390, or portions of the answer change monitor 390, may be integrated into the QA system pipeline 300 in one or more of the stages 320-380. Moreover, the user profile database 394 may be separate from the answer change monitor 390 and may be integrated with other data processing systems not shown, e.g., an employee database system, patient records database, organization database system, or the like.

Figure 4A:
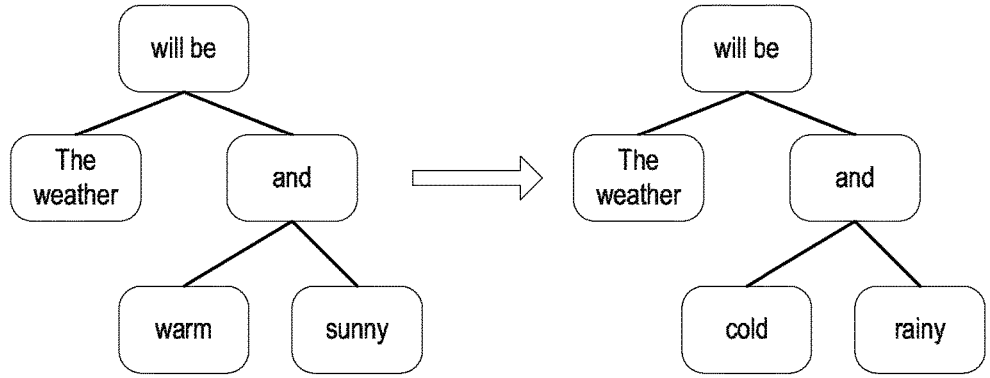
FIGS. 4A-4C illustrate examples of parse trees for answers generated for the same question as may be generated by an answer change determination engine in accordance with one illustrative embodiment.
Figure 4B:
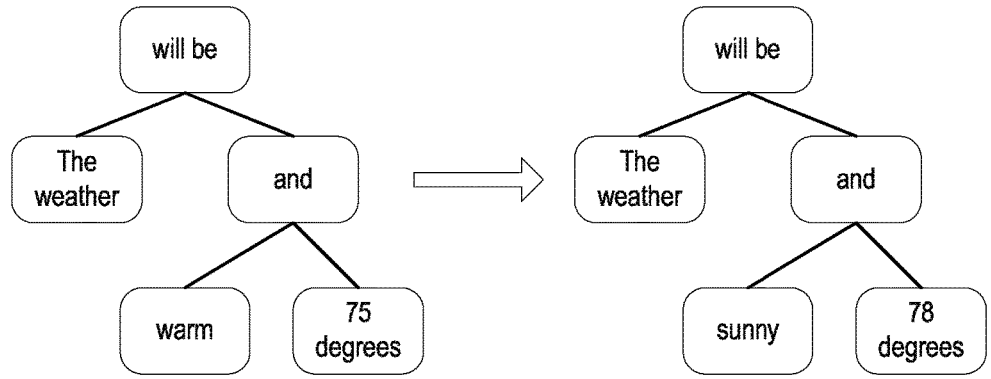
Figure 4C:
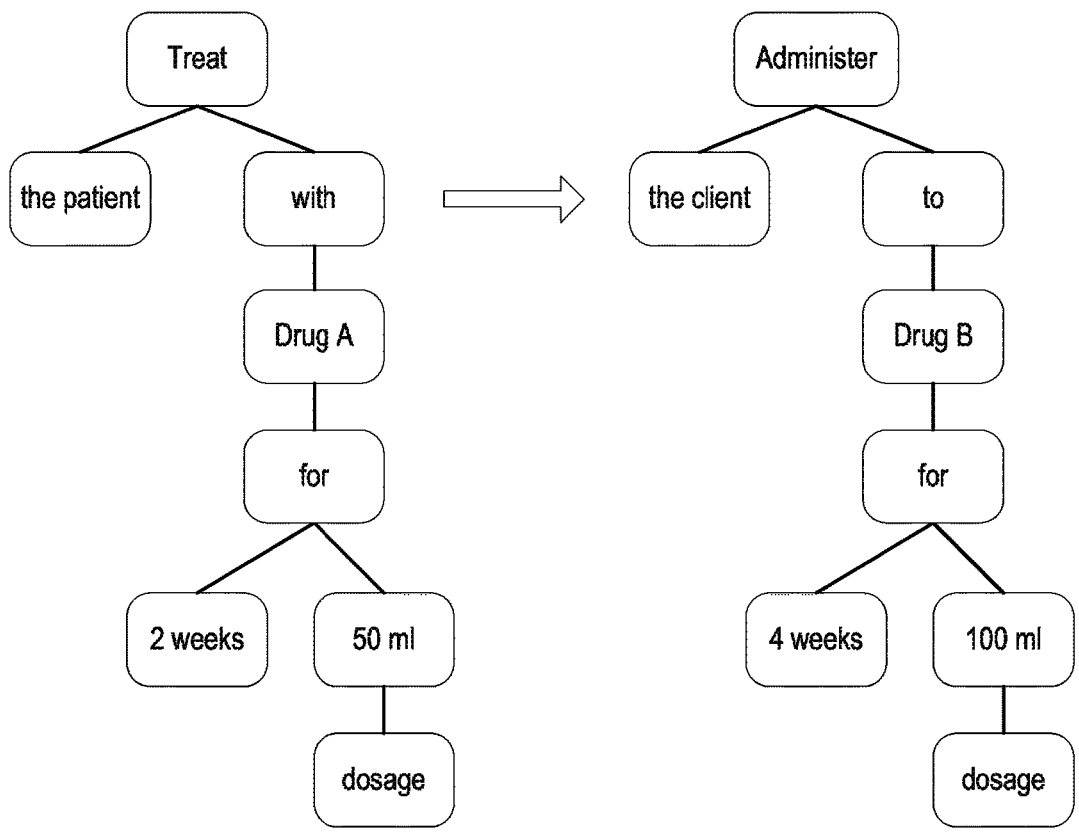

As mentioned above, one way in which changes in answers may be identified, such as may be employed by logic of an answer change determination engine 396 in FIG. 3, for example, is to generate parse trees for the answers, identify the portions of the parse trees that are different and which correspond to one another, and determining if there is a similarity or difference between the corresponding portions of the parse trees. FIGS. 4A-4C illustrate examples of parse trees for answers generated for the same question as may be generated by an answer change determination engine in accordance with one illustrative embodiment. The example parse trees shown in FIGS. 4A and 4B are for answers generated to the question "What will the weather be tomorrow?"

As shown in FIG. 4A, a previous answer to the question was "The weather will be warm and sunny" with the corresponding parse tree being shown on the left side of the figure. The current answer generated by the QA system pipeline as a result of resubmitting the question to the QA system pipeline is that "The weather will be cloudy and rainy" with the corresponding parse tree shown on the right hand side of the figure. Through analysis and comparison of these parse trees, one can see that the subject-verb-object (SVO) analysis indicates an agreement, or similarity, between the two answers, i.e. (weather, to be) with antonyms being present in the third level of the parse tree. Thus, there is a high degree of difference due to the presence of the antonyms. In addition, the highest IDF terms are warm/sunny and cold/rainy, which leads to a high degree of change determination as well. Thus, using either or both modes of analysis, the mechanisms of the illustrative embodiments determine a large degree of difference in the answers which may warrant an answer change notification being sent to all registered users.

With reference now to FIG. 4B, a different set of answers are generated to the question with the previous answer being "The weather will be warm and 75 degrees" and the current answer being "The weather will be sunny and 78 degrees." Through the analysis and comparisons performed by the mechanisms of the illustrative embodiments, it is determined that there is a domain-specific synonym in the third level of the parse tree, i.e. warm/sunny (warm may not be a synonym to sunny in other domains). In addition, it is determined that there is a very small difference in the temperatures mentioned in the answers from 75 degrees to 78 degrees (approximately 5% difference). Thus, the difference in the previous and current answers may be determined by the mechanisms of the illustrative embodiments to be of a low degree of change not warranting a sending of an answer change notification. However, as mentioned above, in some illustrative embodiments this may be overridden by the evaluation of user profile information.

FIG. 4C illustrates an example parse tree that may be utilized with the mechanisms of the illustrative embodiments for another example question of the type "How do should I treat Patient A for Disease B?" As shown in FIG. 4C, the previous answer was "Treat the patient with Drug A for two weeks at 50 ml dosage" and the current answer is "Administer to the client Drug B for four weeks at 100 ml dosage." The parse tree for the previous answer is on the left side of the figure while the parse tree for the new or current answer is on the right side of the figure. These parse trees comprise a plurality of synonyms which would indicate only a minimal change in the answers by themselves. However, the highest IDF terms in these answers are the drug names which are not synonyms and are in fact completely different. As a result, the answer to the question is determined to have had a high degree of change from the previous answer to the new or current answer and, as a result, an answer change notification may be sent to the registered users. It should be noted that if the same drug name was used in both answers, e.g., Drug A, then the degree of difference in the answers may be determined to be a medium degree of change as the numerical values have doubled with regard to the dosage.

Figure 5:
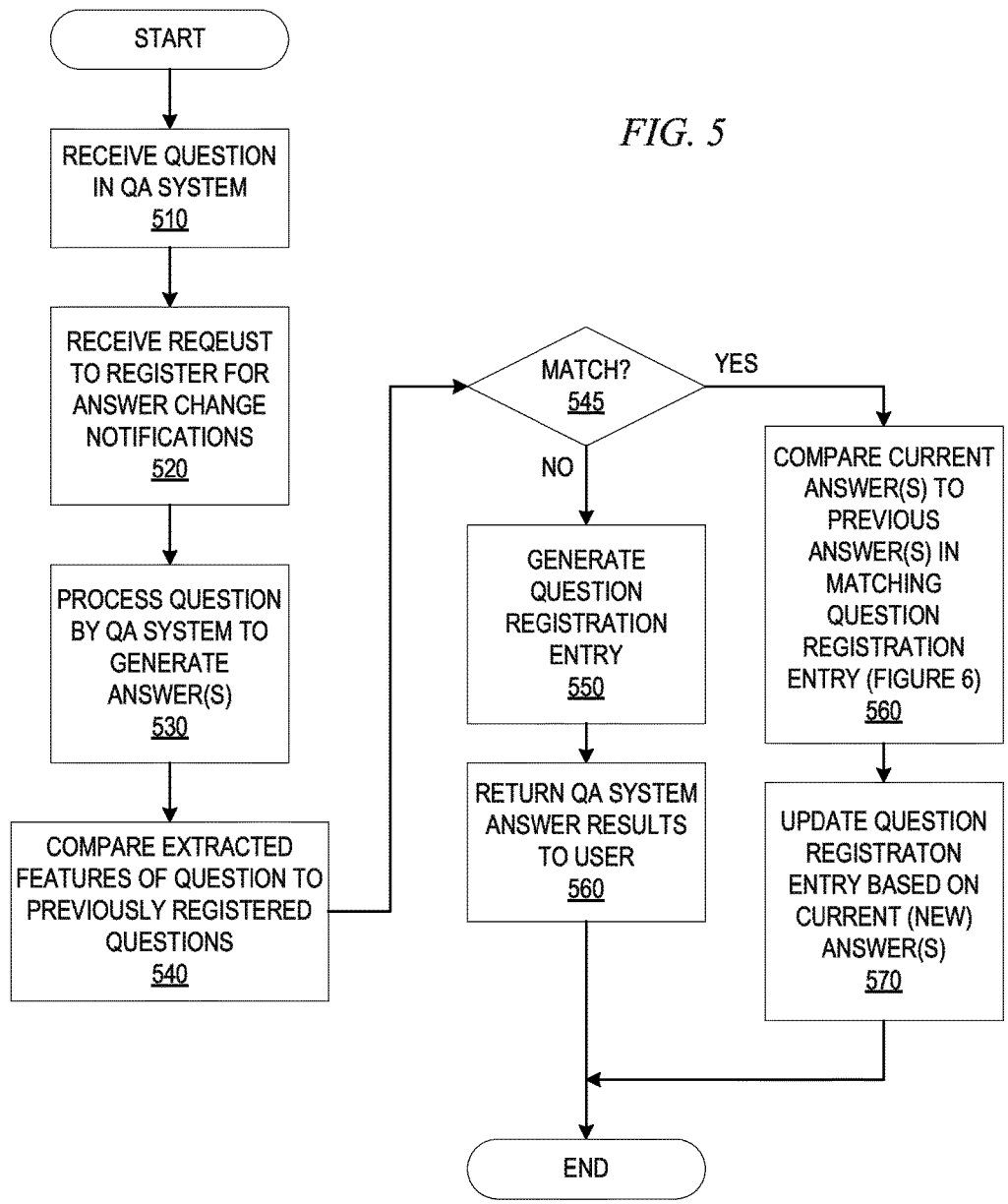
FIG. 5 is a flowchart outlining an example operation of an answer change monitor for registering a question for answer change modification in accordance with one illustrative embodiment.

FIG. 5 is a flowchart outlining an example operation of an answer change monitor for registering a question for answer change modification in accordance with one illustrative embodiment. As shown in FIG. 5, the operation starts with a user submitting a question to a question and answer system (step 510). The user specifies, through a user interface, whether the question is to be registered for answer change notifications (step 520). The question is processed by the QA system to generate at least one answer to the input question which includes parsing the question and extracting the features of the question to determine queries to be applied against a corpus or corpora to generate and evaluate candidate answers (step 530).

The extracted features are used to compare the question to previously registered questions in a question registration database (step 540) to determine if a similar question has been previously registered (step 545). If not, then a question registration entry is generated and added to the question registration database (step 550), the answer(s) generated by the QA system are returned to the user (step 560) and the operation terminates.

If there is a similar question already registered in the question registration database, then the currently generated answer(s) may be compared to the previously generated answer(s) for the similar question in the manner described above and outlined in FIG. 6 hereafter (step 570). The question entry in the question registration database may then be updated to reflect the new answer generated, register the current user as a user to be notified of answer changes, and link the entry with the user profile of the current user (step 580). The answer generated by the QA system may then be output to the current user and appropriate answer change notifications may be transmitted to previously registered users (step 590). The operation then terminates.

Figure 6:
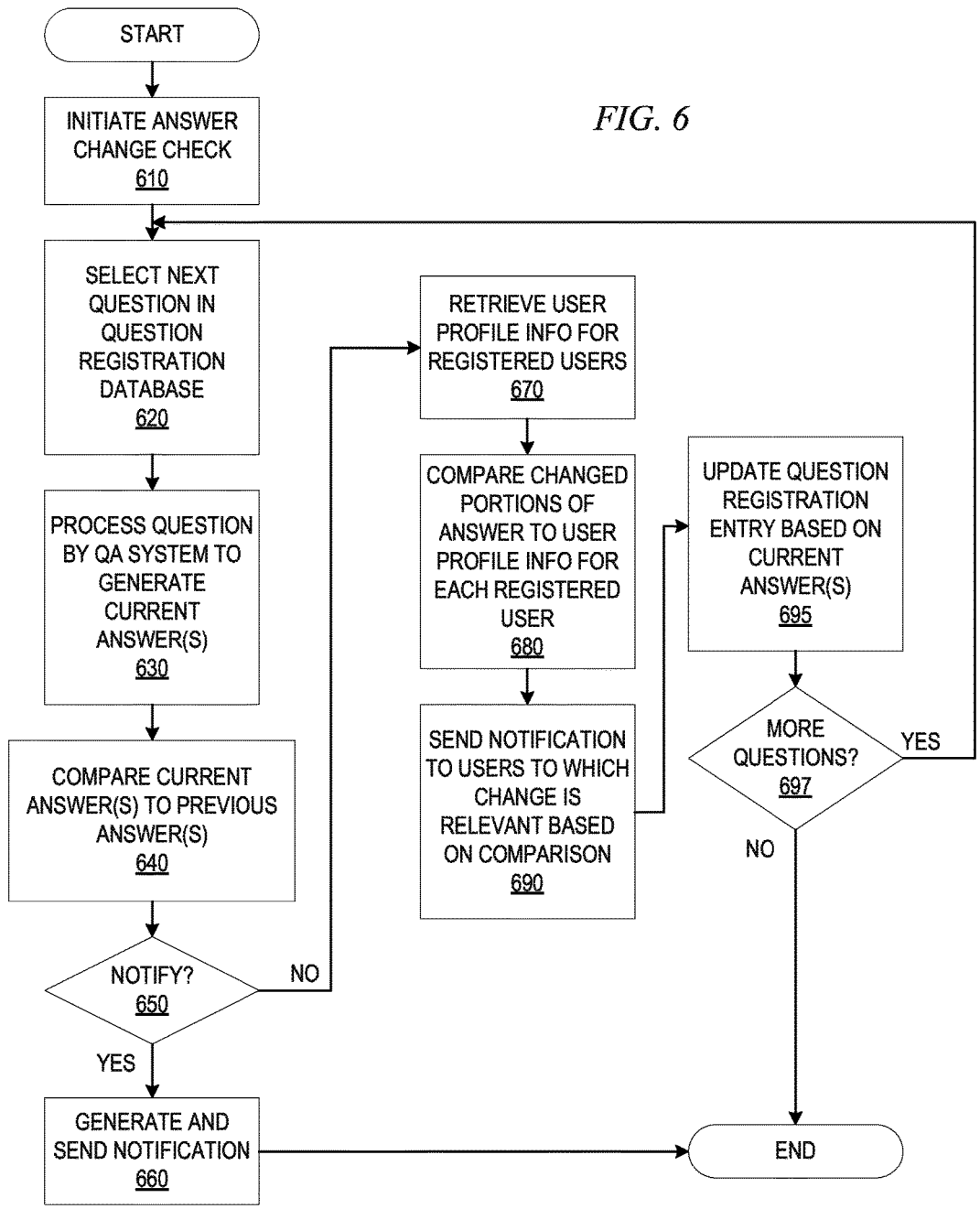
FIG. 6 is a flowchart outlining an example operation of an answer change monitor for monitoring answer changes of registered questions and sending answer change notifications to registered users in accordance with one illustrative embodiment.

FIG. 6 is a flowchart outlining an example operation of an answer change monitor for monitoring answer changes of registered questions and sending answer change notifications to registered users in accordance with one illustrative embodiment. It should be appreciated that since there are different illustrative embodiments described above, and different alternatives for operation, e.g., when to use user profile information to further determine whether to send answer change notifications, FIG. 6 is provided as just one illustrative embodiment.

As shown in FIG. 6, the operation starts with a check for answer changes being triggered, e.g., through a scheduled event, detection of a triggering event, administrator or user manual initiation of the check, or the like (step 610). A next question, which in a first iteration is the first question and in a last iteration is the last question, in the question registration database, is selected for resubmission to the QA system pipeline and its question entry in the question registration database is retrieved (step 620). The question is processed by the QA system pipeline which generates one or more current answers to the question (step 630). The one or more current answers are compared to one or more previous answers identified in the retrieved question entry to determine a degree of change in the answer to the question (step 640).

A determination is made as to whether the degree of change in the answer meets or exceeds one or more predetermined criteria for answer change notification (step 650). If so, then user profile information for all registered users that have requested answer change notifications for the particular question is retrieved (step 660) and answer change notifications are generated and transmitted to the users based on contact information specified in the user profile information. It should be appreciated that in some illustrative embodiments, rather than sending the answer change notification to all registered users when the criteria are met or exceeded, the user profile information may be further utilized to identify which users the answer change is relevant to and send the answer change notifications only to those users rather than all of the registered users.

However, in the depicted illustrative embodiment, relevance to users is determined in response to the degree of change not meeting or exceeding the one or more predetermined criteria or the degree of change being equal to or less than another criteria that may be established. Thus, in response to the determination indicating that the degree of change in the answer does not meet or exceed the one or more criteria, user profile information for the registered users wishing answer change notification is retrieved based on the user identifiers in the question entry and a user profile database (step 670). The changed portions of the answer to the question are then compared against the user profile information of each registered user to determine whether the changes to the answer are relevant to the particular registered user (step 680). For those registered users to which the change in the answer is determined to be relevant, answer change notifications are generated and transmitted to those registered users (step 690). The question entry in the question registry database is then updated with the new or current answer to the question (step 695), and the operation determines if additional questions are to be resubmitted to the QA system pipeline (step 697). If so, the operation returns to step 620; otherwise the operation terminates.

Thus, the illustrative embodiments provide mechanisms for notifying users when answers to their previously submitted questions have changed. These notifications may be tailored to the particular user profile for the user such that only users to which the changes in the answers are relevant may be sent these answer change notifications.

It should be appreciated that while the present description is primarily directed to the comparison of a single current answer to a single previously generated answer for the same question, the present invention is not limited to such. Rather, as previously stated above, the mechanisms of the illustrative embodiments may be applied to multiple answers, such as the ranked listing of candidate answers generated by the QA system pipeline. The evaluation of changed answers may further be extended to identifying changes in the rankings of the candidate answers relative to one another such that one candidate answer is more highly ranked than previously determined or more lowly ranked.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a question and answer (QA) system comprising a processor and a memory, for monitoring changes in answers to previously submitted questions, the method comprising:
   (a) receiving, by the QA system, a question for which an answer is to be generated by the QA system based on analysis of a corpus of information;
   (b) generating, by the QA system, a first answer to the question;
   (c) registering, by the QA system, the question, the first answer, and an identifier of a notification party, in a question registration data structure;
   (d) generating, by the QA system at a later time than operation (b), a second answer to the question;
   (e) determining, by the QA system, a degree of change between the first answer and the second answer; and
   (f) transmitting, by the QA system, an answer change notification to the notification party based on the degree of the change between the first answer and second answer to the question, wherein:
   operation (d) comprises:
      retrieving, from the question registration data structure, an entry corresponding to the question; and
      automatically re-submitting the question to the QA system based on the retrieved entry, wherein the question registration data structure stores entries for a plurality of different questions previously submitted to the QA system,
   each entry in the question registration data structure comprises the question, a last answer generated by the QA system for the question, and one or more notification parties that have requested to receive answer change notifications regarding the question associated with the entry, and
   operation (f) further comprises:
      determining a measure of relevance, of the change in the answer to the question, to each notification party in the one or more notification parties;
      identifying a subset of the notification parties, from the one or more notification parties identified in the entry corresponding to the question, with which the measure of relevance meets a predetermined criteria; and
      transmitting the answer change notification to the subset of notification parties but not transmitting the change notification to other notification parties in the one or more notification parties.

2. The method of claim 1, wherein operation (d) comprises at least one of processing the question with a different logic implemented in the QA system than is used when performing operation (b) or processing the question with a different corpus of information, upon which the QA system operates, from a corpus of information used when generating the first answer in operation (b).

3. The method of claim 1, wherein determining the measure of relevance, identifying the subset of the notification parties, and transmitting the answer change notification to the subset of notification parties is performed in response to the degree of the change in the answer not meeting a predetermined threshold, and wherein, in response to the degree of the change in the answer meeting the predetermined threshold, the answer change notification is sent to all of the notification parties in the one or more notification parties.

4. The method of claim 1, wherein determining the measure of relevance comprises comparing features of the change in the answer to a user profile of the notification party.

5. The method of claim 1, further comprising:
(g) determining, by the QA system, a relevance of the change in the answer to the notification party, wherein transmitting the answer change notification is performed only in response to the measure of the degree of difference meeting a predetermined criteria and the relevance meeting a predetermined criteria for the notification party.

6. The method of claim 1, wherein operation (d) is initiated in response to a triggering event, and wherein the triggering event is one of a detection of a change in a corpus of information operated on by the QA system, a change in logic implemented by the QA system, or an authorized user manually requesting the second processing being performed.

7. The method of claim 1, wherein operation (c) comprises, for each entry in the question registration data structure:
determining a degree of similarity of the question to a previously submitted question corresponding to the entry;
determining whether a similarity of the question to the previously submitted question meets a predetermined criteria; and
registering the question in the question registration data structure by associating information regarding the question with the entry in response to the similarity of the question to the previously submitted question meeting the predetermined criteria.

8. A computer program product comprising a computer readable storage medium having a computer readable program stored therein, wherein the computer readable program, when executed on a data processing system implementing a Question and Answer (QA) system, causes the QA system to:
(a) receive a question for which an answer is to be generated by the QA system based on analysis of a corpus of information;
(b) generate a first answer to the question;
(c) register the question, the first answer, and an identifier of a notification party, in a question registration data structure;
(d) generate, at a later time than operation (b), a second answer to the question;
(e) determine a degree of change between the first answer and the second answer; and
(f) transmit an answer change notification to the notification party based on the degree of the change between the first answer and second answer to the question, wherein:
operation (d) comprises:
retrieving, from the question registration data structure, an entry corresponding to the question; and
automatically re-submitting the question to the QA system based on the retrieved entry, wherein the question registration data structure stores entries for a plurality of different questions previously submitted to the QA system,
each entry in the question registration data structure comprises the question, a last answer generated by the QA system for the question, and one or more notification parties that have requested to receive answer change notifications regarding the question associated with the entry, and
operation (f) further comprises:
determining a measure of relevance, of the change in the answer to the question, to each notification party in the one or more notification parties;
identifying a subset of the notification parties, from the one or more notification parties identified in the entry corresponding to the question, with which the measure of relevance meets a predetermined criteria; and
transmitting the answer change notification to the subset of notification parties but not transmitting the change notification to other notification parties in the one or more notification parties.

9. The computer program product of claim 8, wherein operation (d) comprises at least one of processing the question with a different logic implemented in the QA system than is used when performing operation (b) or processing the question with a different corpus of information, upon which the QA system operates, from a corpus of information used when generating the first answer in operation (b).

10. The computer program product of claim 8, wherein determining the measure of relevance, identifying the subset of the notification parties, and transmitting the answer change notification to the subset of notification parties is performed in response to the degree of the change in the answer not meeting a predetermined threshold, and wherein, in response to the degree of the change in the answer meeting the predetermined threshold, the answer change notification is sent to all of the notification parties in the one or more notification parties.

11. The computer program product of claim 8, wherein determining the measure of relevance comprises comparing features of the change in the answer to a user profile of the notification party.

12. The computer program product of claim 8, further comprising:
(g) determining, by the QA system, a relevance of the change in the answer to the notification party, wherein transmitting the answer change notification is performed only in response to the measure of the degree of difference meeting a predetermined criteria and the relevance meeting a predetermined criteria for the notification party.

13. The computer program product of claim 8, wherein operation (d) is initiated in response to a triggering event, and wherein the triggering event is one of a detection of a change in a corpus of information operated on by the QA system, a change in logic implemented by the QA system, or an authorized user manually requesting the second processing being performed.

14. A Question and Answer (QA) system comprising:
a processor; and
a memory coupled to the processor, wherein the memory comprises instructions which, when executed by the processor, cause the processor to:
(a) receive a question for which an answer is to be generated by the QA system based on analysis of a corpus of information;
(b) generate a first answer to the question;
(c) register the question, the first answer, and an identifier of a notification party, in a question registration data structure;
(d) generate, at a later time than operation (b), a second answer to the question;
(e) determine a degree of change between the first answer and the second answer; and
(f) transmit an answer change notification to the notification party based on the degree of the change between the first answer and second answer to the question,
wherein:
operation (d) comprises:
retrieving, from the question registration data structure, an entry corresponding to the question; and
automatically re-submitting the question to the QA system based on the retrieved entry, wherein the question registration data structure stores entries for a plurality of different questions previously submitted to the QA system,
each entry in the question registration data structure comprises the question, a last answer generated by the QA system for the question, and one or more notification parties that have requested to receive answer change notifications regarding the question associated with the entry, and
operation (f) further comprises:
determining a measure of relevance, of the change in the answer to the question, to each notification party in the one or more notification parties;
identifying a subset of the notification parties, from the one or more notification parties identified in the entry corresponding to the question, with which the measure of relevance meets a predetermined criteria; and
transmitting the answer change notification to the subset of notification parties but not transmitting the change notification to other notification parties in the one or more notification parties.

* * * * *